United States Patent
Macklin et al.

(10) Patent No.: US 6,808,560 B2
(45) Date of Patent: Oct. 26, 2004

(54) PUMPABLY VERIFIABLE FLUID FIBER COMPOSITIONS

(75) Inventors: Michael B. Macklin, Westford, MA (US); Anandakumar Ranganathan, Waltham, MA (US); Klaus-Alexander Rieder, Beverly, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/359,742

(22) Filed: Feb. 6, 2003

(65) Prior Publication Data

US 2003/0116063 A1 Jun. 26, 2003

Related U.S. Application Data

(63) Continuation of application No. 09/962,830, filed on Sep. 25, 2001, now Pat. No. 6,569,233.

(51) Int. Cl.[7] ............................................. C04B 24/00
(52) U.S. Cl. .................. 106/644; 106/724; 106/802; 106/823
(58) Field of Search .............................. 106/644, 724, 106/802, 823

(56) References Cited

U.S. PATENT DOCUMENTS

| | | | |
|---|---|---|---|
| 3,716,386 A | 2/1973 | Kempster et al. ............. 106/90 |
| 3,992,344 A | * 11/1976 | Sander et al. | |
| 4,224,377 A | 9/1980 | Moens .......................... 428/369 |
| 4,367,191 A | 1/1983 | Cuculo et al. ............... 264/187 |
| 4,547,403 A | * 10/1985 | Smith ........................... 427/196 |
| 5,320,451 A | 6/1994 | de Mars et al. ............. 424/451 |
| 5,330,827 A | 7/1994 | Hansen ....................... 428/289 |
| 5,399,195 A | 3/1995 | Hansen et al. .............. 106/711 |
| 5,439,055 A | * 8/1995 | Card et al. .................. 166/280 |
| 5,456,752 A | * 10/1995 | Hogan ......................... 106/802 |
| 5,618,341 A | 4/1997 | Andersen et al. ....... 106/287.35 |
| 5,628,822 A | * 5/1997 | Hogan ......................... 106/802 |
| 5,679,145 A | 10/1997 | Andersen et al. ......... 106/162.5 |
| 5,683,772 A | 11/1997 | Andersen et al. .......... 428/36.4 |
| 5,716,447 A | * 2/1998 | Matsuo et al. .............. 106/802 |
| 5,747,125 A | 5/1998 | Markulin .................. 428/34.8 |
| 5,753,368 A | 5/1998 | Berke et al. ................. 428/375 |
| 5,817,493 A | 10/1998 | Reetz et al. ................. 435/182 |
| 5,895,688 A | 4/1999 | Bertoncini et al. ......... 427/421 |
| 5,945,049 A | * 8/1999 | Vandermeer .................. 264/87 |
| 5,993,537 A | * 11/1999 | Trottier et al. .............. 106/724 |
| 6,016,872 A | 1/2000 | Davis ........................ 166/312 |
| 6,164,380 A | 12/2000 | Davis ........................ 166/312 |
| 6,379,498 B1 | * 4/2002 | Burns et al. ................. 162/158 |
| 6,423,134 B1 | * 7/2002 | Trottier et al. .............. 106/302 |
| 6,489,283 B1 | * 12/2002 | Afriat ......................... 510/417 |
| 6,569,233 B2 | * 5/2003 | Macklin et al. ............. 106/644 |

FOREIGN PATENT DOCUMENTS

| | | | | |
|---|---|---|---|---|
| CN | 1157868 | * | 8/1997 | |
| EP | 736501 A1 | | 10/1996 | ........... C04B/28/02 |
| EP | 0886628 B1 | | 11/1999 | ........... C04B/40/00 |
| FR | 2124574 | * | 9/1972 | |
| GB | 2047766 | * | 12/1980 | |
| IL | 59577 | * | 5/1983 | |
| JP | 56070877 | * | 6/1981 | |
| JP | 58104059 | * | 6/1983 | |
| JP | 2000063202 | * | 2/2000 | |
| WO | 97/34849 | | 9/1997 | ........... C04B/40/00 |
| WO | 9734849 A1 | | 9/1997 | ........... C04B/40/00 |

* cited by examiner

*Primary Examiner*—Paul Marcantoni
(74) *Attorney, Agent, or Firm*—Craig K. Leon; William L. Baker

(57) ABSTRACT

The invention relates to fiber compositions that can be pumped and metered in the fashion of fluid chemical admixtures into a concrete mix, thereby enabling the fibers to be dispensed by concrete ready-mix plant operators who can provide verification of fiber administration and dosage. The fibers, particularly plastic shrinkage control fibers having large cumulative surface area, are suspended in an aqueous medium such that their surface area is already wetted out, thereby virtually assuring that substantial uniform fiber dispersion can be achieved without clumping and the delay that is usually required by fiber intermixing.

20 Claims, No Drawings

PUMPABLY VERIFIABLE FLUID FIBER COMPOSITIONS

This is a continuation of application Ser. No. 09/962,830, filed Sep. 25, 2001, now U.S. Pat. No. 6,569,233.

FIELD OF THE INVENTION

The invention relates to fibers for plastic shrinkage crack control in cementitious compositions, and more particularly to a fiber composition that can be pumped and metered in a fashion similar to dispensing of fluid-type chemical admixtures, thereby facilitating verification of accurate dosage and achieving rapid and substantially uniform fiber dispersion within the mix.

BACKGROUND OF THE INVENTION

It is known in the construction industry to add fibers into fresh cementitious mixtures to improve characteristics of the resulting hardened structure. Natural fibers (e.g. Sisal, cotton) and fibers made of steel, glass, carbon or synthetic materials are typically added into concrete to improve fracture toughness and to retard crack propagation. Concrete is prone to self-induced cracking, and, as it is a brittle material, these cracks propagate readily under relatively low stresses.

Self-induced, non-structural cracks occur in large masses of ready-mixed concrete or shotcrete due to small cracks that form early (e.g., cracks resulting from shrinkage of concrete or shotcrete during its plastic state), and these are subsequently propagated by stresses induced by changes in the dimension of such relatively large structures. Pavement concrete units, for example, are typically about 3 meters by 10 meters by 200 millimeters. Small cracks in such concrete can readily propagate, producing a weak link that results in subsequent fracture. This clearly visible cracking is often the only form of cracking that is perceived as being of importance, but it is a direct result of much smaller and probably essentially invisible earlier crack development.

In U.S. Pat. No. 5,399,195, Hansen et al. taught the use of very fine synthetic polymer fibers (e.g., polypropylene, polyethylene, polyester) for preventing self-induced cracks from developing due to plastic shrinkage of concrete at the micro-level. To promote substantially homogeneous dispersal of the fine fibers in the concrete using conventional mixing techniques and equipment, this patent disclosed that fiber bundles containing up to about 10,000 fibers (e.g., filaments, tapes) could be treated with conventional wetting agents to render them hydrophilic, thereby facilitating their introduction into concrete.

Other means are known for admixing fibers into concrete. For example, U.S. Pat. No. 4,961,790 of Smith et al. disclosed a soluble bag for introducing fibers into a concrete mix. In U.S. Pat. No. 5,224,774, Valle et al. disclosed non-water-soluble packaging that disintegrated due to the grinding action of concrete thereby achieving substantially uniform fiber dispersal. These enabled ready-mix truck operators to avoid having to handle loose fibers and facilitated their dispersal within the mix.

Nevertheless, there remains a need for verifying that plastic shrinkage control fibers are incorporated into the concrete mix at the correct dosage; and, secondly, to ensure that they are properly intermixed to avoid balling and to achieve substantially uniform dispersal throughout the concrete mix. Synthetic polymer fibers, particularly the fine fibers or fibrillated tapes used for plastic shrinkage control, are difficult to see in the wet mix. Not only might such fibers have transverse dimensions as small as 5–30 $\mu$m, but they tend to be incorporated at low dosage rates due to their cumulatively large surface area. If clumping occurs beneath the concrete surface, these remain undetected; if clumps are found at the surface, these may be detected and removed for aesthetic reasons. In either case, the proper fiber dosage is not achieved; the risk of plastic shrinkage cracking increases.

Another major difficulty in verification is that fibers are added by the ready-mix truck operator who delivers the concrete to the construction site. The fibers are usually incorporated in dry batch amounts of 0.2–2.0 pound bags into the ready-mix trucks, wherein the bags disintegrate or dissolve to release the fibers into the concrete. Those ready-mix truck operators who are unscrupulous may use fewer than the prescribed amount of bags to pocket the difference and avoid the messiness, labor, and 10–15 minute delay necessitated per trip by this manual process. On the other hand, those ready-mix truck operators who are merely sloppy or negligent may fail to provide adequate mixing, may use the wrong fiber dosage or type, or may forget the fibers altogether. In each case, the risk of plastic shrinkage cracking increases (as does the ready-mix producer's liability for faulty concrete).

Ideally, the present inventors believe that automated addition of fibers at a ready-mix plant would help to resolve the multi-faceted problem of verification and to minimize or eliminate expensive concrete ready-mix truck standing time. This is because fiber addition can be performed under certifiable conditions by the batch plant operator, who has customarily been responsible for ensuring that desired chemical admixtures (e.g., water reducers, set accelerators or retarders, pigments, etc.) are added into the concrete mix at prescribed dosage levels. In other words, the fiber addition could be automated and recorded by computer panel instead of being performed manually as is the present case. This would avoid having to rely on truck operators who might lack the requisite experience, training, honesty, concern, diligence, or patience (or all of the above) to perform the task properly.

At present, a number of bulk fiber system for automated dispensing of dry fibers are available. For example, Intech Corporation of Frederick, Colo., manufactures a system employing a vacuum to convey dry fibers into aggregate weigh hoppers, conveyor belts, or into concrete trucks. The system also purportedly has a capability for handling up to 300 pound bulk bags by automatic reloading. However, the present inventors believe that such bulk loading equipment may be too costly, complicated, and inconvenient for ready-mix plant operators to use or to integrate with existing chemical admixture dispensing equipment. This dry bulk fiber system does not provide verification that extremely fine, high-surface-area fibers of the kind used for plastic shrinkage control are sufficiently wetted out so as to achieve substantially uniformly dispersion in the concrete.

Accordingly, the present inventors believe that novel fibers and methods of fiber addition are needed.

SUMMARY OF THE INVENTION

In surmounting the disadvantages of the prior art, the present invention provides an aqueous fiber composition useful for dispensing fibers into matrix materials such as concrete or shotcrete, using pumping and metering equipment that permits automated control and verifiability of accurate dosage amounts. Although fibers made from synthetic polymers (e.g., polyolefin) are typically hydrophobic, suspending them in an aqueous fluid environment is believed to expedite their introduction into a wet concrete mix, to minimize clumping and facilitate intermixing, and to ensure substantially uniform distribution within the cementitious mix.

Thus, an exemplary fiber composition of the invention comprises a plurality of fibers, preferably made of synthetic polymers, glass, carbon or regeneratable sources, are suspended in an aqueous environment comprising water but essentially devoid of water-settable inorganic binder material, the fibers being present in the range of 5–40% based on weight of the. composition, the aqueous environment comprising at least one viscosity modifier for increasing the viscosity of the water within the aqueous environment, which has a Brookfield viscosity of 5,000–200,000 milliPascal*seconds measured at 25 degrees Celsius.

Exemplary methods of the invention comprise dispensing the above-described fiber composition into a cementitious mix, and preferably this is accomplished by pumping and metering the prescribed dosage of fibers into the mix. Accurate dosages of the fibers may thus be performed and verified by the concrete manufacturer.

Thus, the present invention provides the ability to pump and meter fibers at high speed into cementitious mixtures and to provide the ability to automate and to monitor the fiber addition. Morever, the fiber compositions of the invention are also believed to improve pumpability and cohesiveness of reinforced cementitious materials such as shotcrete and spray-applied fireproofing. In addition to use in ready-mix concretes, the fiber compositions are particularly useful in self-compacting concretes and mortars in which compaction and workability are issues.

Further advantages and features of the invention are further described in detail hereinafter.

DESCRIPTION OF PREFERRED EMBODIMENTS OF THE INVENTION

The fiber compositions of the present invention are intended for modifying properties of any matrix composition, including, without limitation, adhesives, emulsions, composite materials (e.g., resins), plastics, elastomers such as rubber, etc., and cementitious materials. Of particular importance to the present inventors are hydratable cementitious materials such as ready-mix concrete, precast concrete, masonry, shotcrete, bituminous concrete, gypsum-based compositions (such as compositions for wallboard), gypsum- and/or Portland cement-based fireproofing compositions (for boards and spray-application), and other hydratable cementitious compositions.

In connection with hydratable cementitious compositions, the terms "paste," "mortar," and "concrete" are terms of art: pastes are mixtures composed of a hydratable cementitious binder (usually, but not exclusively, Portland cement, masonry cement, or mortar cement, and may also include limestone, hydrated lime, fly ash, blast furnace slag, pozzolans, metakaolin, and silica fume or other materials commonly included in such cements) and water; mortars are pastes additionally including fine aggregate (e.g., sand); and "concretes" are mortars additionally including coarse aggregate (e.g., gravel, stones). The term "cementitious" thus refers to and includes the foregoing. For example, a cementitious composition may be formed by mixing required amounts of certain materials, e.g., hydratable cementitious binder, water, and fine and/or coarse aggregate, as may be desired, with fibers as described herein.

The fibers of the invention may comprise material selected from the group consisting of polyethylene, high density polyethylene, low density polyethylene, ultra high molecular weight polyethylene, polypropylene, polyoxymethylene, polyacrylate, polyvinyl acetate, polyester, polyamide, thermotropic liquid crystal polymers, regenerated cellulose, natural fibers, carbon fibers and glass fibers. Plastic shrinkage performance may be achieved using a number of fiber shapes, such as monofilament (round), elliptical, flat (ribbon shaped), prefibrillated (e.g, slit tape, slit sheet), or other shape.

Preferred synthetic polymers are polypropylene and polyethylene, with polypropylene being most preferred for controlling plastic shrinkage cracking in concrete. Exemplary individual fiber bodies of the invention may comprise 100% polypropylene, or, as another example, may comprise predominantly polypropylene (e.g., at least 70–99%) with the remainder comprising another polymer (such as high density polyethylene, low density polyethylene) or optional fillers, processing aids, and/or wetting agents, such as are conventionally used in the manufacture of polymer fibers. Fibers believed suitable for the present invention and particularly for plastic shrinkage control, are disclosed in U.S. Pat. No. 5,399,195 of Hansen et al., which is incorporated herein by reference. Preferably, the plurality of fibers comprise individual fibers having two opposed ends connected by an elongate intermediate body, the average length of the fiber bodies being 5–50 millimeters, and more preferably 10–20 millimeters in length, and the mean transverse dimension of said fiber bodies being 5–100 $\mu$m, and more preferably 15–35 $\mu$m. Fibers within these dimensions are available from Grace Construction Products of Cambridge, Mass.

Another exemplary fiber material believed suitable for use in the present invention comprises a polypropylene coated with a polyhydroxyaminoether material. Such fibers are available from Dow Chemical, Midland, Mich.

Exemplary fibers of the invention are suspended in a wet fluid aqueous environment with the resultant combination being characterizable as having the consistency of a pumpable "grease" or "wet paste." While it is known to coat or lubricate fibers with conventional wetting agents, this concept is different than an aqueous suspension of synthetic polymer fibers that is pumpable and capable of being metered. While it is also known that synthetic polymer fibers can be suspended in sprayable shotcrete slurries and sprayable fireproofing slurries (which contain hydratable cementitious binders), the present inventors believe that it is novel to employ, as a means for delivering and pumping synthetic polymer fibers into a cementitious mix, an aqueous suspension of synthetic polymer fibers that is essentially devoid of water-settable inorganic binder material. The term "essentially" is used herein to refer to the total absence of any water-hardenable inorganic binder material, or else to its near-absence (ie. amounts so miniscule or de minimum as not to cause the aqueous suspension of fibers to stiffen or harden whereby pumpability is thwarted).

Preferably, the plurality of fibers is added into the aqueous environment (the suspension medium) incrementally and mixed by slow rotating mixing elements. It is preferred that the fibers are present in bundles, which arise conventionally through the fiber manufacturing process, wherein bunches of continuous strands are chopped to the desired lengths and may be fixed into bundles using conventional wetting agents (e.g., surfactants, emulsions, etc.). If the fiber is packaged with minimal mechanical disturbance, the bundles can remain intact. The fiber bundles are deliberately kept intact in the suspension also to facilitate flowability of the fibers, such that the resulting thick suspension has the necessary flow characteristics to permit continuous pumping using mechanical pumping equipment. When fibers are in bundles, less water is attached to the fiber surface and thus more water is available for flow especially at high fiber concentrations. Also, each bundle is believed to act as a solid independent suspended particle within the fluid medium, and consequently this reduces fiber-fiber interaction which otherwise is detrimental to flow characteristics of the suspension. The retention of this preferred bundle structure is helped by the high viscosity of the surrounding fluid medium wherein capillary flow is reduced and water is prevented from penetrating the bundles and becoming absorbed.

Accordingly, bundles of fibers (e.g., filaments) are preferably coated with a wetting agent during manufacture or otherwise prior to being inserted into the aqueous suspension medium. The choice of optional wetting agent is not believed to be critical to the present invention, although it would be preferred to choose wetting agents that do not negatively impact the concrete properties and do not introduce substantial amounts of air into the mix. Exemplary wetting agents are disclosed in U.S. Pat. No. 5,399,195 of Hansen et al., incorporated herein by reference. Preferred wetting agents are fatty acid esters of glycerides, fatty acid amides, polyglycol esters, polyethoxylated amides, nonionic surfactants, cationic surfactants and blends of the above (See e.g., U.S. Pat. No. 5,399,195).

In exemplary embodiments of the invention, the fibers (preferably in bundles as just discussed) are suspended in an aqueous environment having a viscosity of 5,000–200,000 milliPascal*seconds as measured by Brookfield viscometer at 25 degrees C. More preferably, the viscosity is 7,500–50,000, and, most preferably, the viscosity is 10,000–20,000 milliPascal*seconds (Brookfield, 25 degrees C.).

While bundled fibers are believed to provide the highest solids content, it is possible to use loose fibers, fibrillated fibers, fibrillatable fibers, tapes, or other conventional shapes as may be customarily supplied into the construction industry.

Exemplary viscosity modifying agents useful for increasing the viscosity of the water in the aqueous suspension can comprise any water soluble polymer, preferably having a linear molecular structure; polyacrylic acid or salt thereof; polyacrylamide; polyvinylmethyl ether; a polysulfonic acid or salt thereof; a polyvinyl alcohol; a polythylene glycol; a polyethylene oxide; a polysaccharides or derivatives thereof; a non-water-settable inorganic binder (nano clay); or mixture thereof. A preferred viscosity modifier is hydroxy propyl methylcellulose. Viscosity modifiers used in the invention should be chosen such that the final concrete properties are not adversely affected, and such that they are compatible with other admixtures that may be incorporated into the final cementitious mix.

A preferred exemplary fiber composition of the invention comprises the following components in the following percentages based on total weight of the composition polypropylene fibers (5–40%); viscosity modifier (0.2–5%); and water (95–60%).

Fiber compositions of the invention may comprise one or more admixtures as may be known in the concrete art. Exemplary admixtures include superplastizicers, water reducers, strength enhancers, concrete-fiber bond enhancing agents, air entrainers, air detrainers, corrosion inhibitors, set accelerators, set retarders, shrinkage reducing admixtures, fly ash, silica fume, pigments, finish enhancing chemicals, internal curing compounds (e.g., methylcellulose), or a mixture thereof. Known admixtures may be employed, such as, for example, those categorized in U.S. Pat. No. 5,203,692 of Valle et al., or in U.S. Pat. No. 6,224,250 of Kreinheder et al, both incorporated by reference herein. The fibers may also be coated with wetting agents or other coating materials known to those of ordinary skill in the art, as previously mentioned above.

The invention therefore provides a novel method for modifying water-based matrix materials, particularly cementitious compositions. Accordingly, an exemplary method comprises dispensing, into a hydratable cementitious composition, a plurality of synthetic polymer fibers suspended in an aqueous environment essentially devoid of a water-settable inorganic binder material; said fibers being in an amount no less than 5 percent based on total weight of composition; said fibers being in an amount no greater than 40 percent based on total weight of composition; said aqueous environment having a viscosity no less than 5000 milliPascal*seconds (as measured by Brookfield viscometer at 25 degrees Celcius); said aqueous environment having a viscosity no more than 200,000 millipascal*seconds (as measured by Brookfield viscometer at 25 degrees C.); and said aqueous environment having at least one viscosity modifier for increasing the viscosity within said aqueous environment.

The fiber compositions of the invention may be packaged in large "totes" (plastic or metal drums or bulk containers) for shipment to concrete ready-mix plants or other locations. The fiber compositions of the invention may also be conveyed in bladders (large bags) that are, in turn, contained in boxes.

In other exemplary embodiments, the aqueous fiber suspensions may comprise one or more biocidal agents. The term "biocidal agents" as used herein refer to agents commonly used for inhibiting bacterial and fungal growth, including fugicidal, germicidal, and insecticidal agents. Preferred biocidal agents include 4-chloro-3 methyl phenol (and other polyhalogenated phenols); sodium-O-phenylphenate; benzylbromoacetate; 1,2-dibromo 2,4-dicyanobutane; dieldrin emulsions; copper compounds; or mixture thereof.

The fiber compositions of the invention may be dispensed into the matrix material (e.g., concrete or other cementitious composition) using conventional metering pump equipment of the kind used for pumping pastes, greases, industrial lubricants, and other viscous liquids as known in these industries. Accordingly, the aqueous fiber suspensions may be dispensed into matrix compositions using pumping and metering equipment conventionally used for dispensing greases, lubrication, flowable pastes, etc. For example, automatic grease lubrication systems are used for pellet presses, gears, stone-crushers, cement kilns, screw conveyors, travelling hoists, process filters, ship steering, and lubrication of rudder shafts, cranes, rotary filters, industrial separators, etc. Such lubrication systems usually involve heavy-duty electric pumps or hydraulic pumps for conveying viscous grease lubricants from bulk barrels, through tubing or pipes, to any number of lubrication points. A preferred pump is a volumetric reciprocating piston pump wherein the number of strokes can be controlled to meter the required amount of the suspension being conveyed under pressure. Thus, the amount of addition can be pumped and metered using piston pumps, for example, and the amounts of addition can be monitored by automated means (e.g., counting the number of piston strokes).

Further features and advantages of the exemplary fiber compositions and processes of the invention may be illustrated by reference to the following example.

EXAMPLE 1

A 1.5 weight % aqueous solution of hydroxypropyl methyl cellulose—referred to as HPMC hereafter—(Methocel K15M, supplied by Dow Chemical Co, USA) is prepared as follows: about 2.5 kg of water is heated to about 90 degrees C. 120 grams of HPMC is dispersed into the hot water while stirring. This mixture is further added to cold water (about 15 degrees C.) while stirring to make up to a total of 8 kg. The mixture is stirred to render it homogeous and is allowed to reach ambient temperature. (Optionally a suitable germicidal agent can be added to this solution to prevent any biological growth during storage). The resulting solution has a Brookfield viscosity of about 10,000 mPa.s at 25 degrees C. Eight kilograms of the solution thus prepared is measured into a mixing machine with slow rotating intermeshing mixing elements. 2 kg of a plastic shrinkage control fiber (having transverse dimension less than 30 μm) (available from Grace Construction Products under the name Microfiber) is added to this solution in increments of 200 grams while mixing. It is important that mixing be performed so as to achieve a homogeneous suspension, and that proper care be taken to cause minimum disturbance to the bundled structure of the fiber. The fiber suspension can be stored in suitable containers such as pails, drums or bag-in-a-box.

The present invention is not to be limited by the foregoing detailed embodiments and example which are provided for illustrative purposes only.

What is claimed is:

1. A fiber composition in a pumpable and meterable form for modifying a matrix composition, comprising:
    a plurality of fibers suspended in an aqueous environment comprising water but essentially devoid of a water-settable inorganic binder material comprising cement or concrete, said fibers being present in an amount no less than 5% and no greater than 40% by total weight of the fiber composition;
    said aqueous environment having at least one viscosity modifier for increasing water viscosity within said aqueous environment, said at least one viscosity modifier comprising an acrylic acid or salt thereof, a polysulfonic acid or salt thereof, a polyvinyl alcohol, a polythylene glycol, a polyethylene oxide, a polysaccharide or derivative thereof, a non-water-settable inorganic material, or a mixture thereof; said aqueous environment having a viscosity no less than 5000 milliPascal·seconds and no greater than 200,000 milliPascal·seconds (as measured by Brookfield viscometer at 25 degrees C.);
    said fibers comprising a material selected from the group consisting of polyethylene, high density polyethylene, low density polyethylene, ultra high molecular weight polyethylene, polypropylene, polyoxymethylene, polyacrylate, polyvinyl acetate, polyester, and polyamide;
    said plurality of fibers comprising individual fibers having two opposed ends connected by an elongate intermediate body, an average length no less than 5 millimeters and no greater than 50 millimeters, and a mean transverse dimension no less than 5 μm and no greater than 100 μm; and
    said plurality of fibers comprising individual fibers being suspended in the form of fiber bundles or said plurality of fibers comprising individual fibers being fibrillatable fibers within said aqueous environment which is essentially devoid of a water-settable inorganic binder material comprising cement or concrete.

2. The composition of claim 1 wherein said fibers are made of polyolefin.

3. The composition of claim 1 wherein said fibers comprise polypropylene, polyethylene, or a mixture thereof.

4. The composition of claim 1 wherein said mean transverse dimension is no greater than 30 μm.

5. The composition of claim 1 wherein said at least one viscosity modifier is hydroxy propyl methylcellulose.

6. The composition of claim 1 wherein said at least one viscosity modifier is present in an amount no less than 0.2 percent and no greater than 5.0 percent based on weight of composition.

7. The composition of claim 1 further comprising an admixture selected from the group consisting of a superplasticizer, water reducer, strength enhancer, concrete-fiber bond enhancement agent, air entrainer, air detrainer, corrosion inhibitor, set accelerator, set retarder, shrinkage reducing admixture, fly ash, silica fume, pigment, a finish enhancing chemicals, and internal curing compound.

8. The composition of claim 1 wherein said plurality of fibers are coated with a wetting agent prior to being suspended in said aqueous suspension.

9. The composition of claim 1 wherein said fiber bundles comprise fibers having wetting agents selected from the group consisting of fatty acid esters of glycerides, fatty acid amides, polyglycol esters, polyethoxylated amides, nonionic surfactants, cationic surfactants, and blends of the foregoing.

10. The composition of claim 1 further comprising a biocidal agent.

11. A method for modifying a matrix material, comprising dispensing into a matrix composition the fiber composition of claim 1.

12. The method of claim 11 wherein said matrix composition is cementitious.

13. The method of claim 12 wherein said fiber composition is pumped and metered into said matrix composition.

14. The method of claim 13 wherein said fiber composition is pumped using a volumetric reciprocating piston pump.

15. The fiber composition of claim 1 wherein said fibers are coated polypropylene.

16. A fiber composition in a pumpable and meterable form for modifying a cementitious composition, comprising:
    a plurality of fibers suspended in an aqueous environment comprising water but essentially devoid of a water-settable inorganic binder material comprising cement or concrete, said plurality of fibers comprising individual fibers having two opposed ends connected by an elongate intermediate body, an average length no less than 5 millimeters and no greater than 50 millimeters, and a mean transverse dimension no less than 5 μm and no greater than 100 μm, said fibers comprising at least one synthetic polymer selected from the group consisting of a polypropylene and a polyethylene, said fibers being present in an amount no less than 5% and no greater than 40%;
    said aqueous environment having at least one viscosity modifier for increasing the water viscosity within said aqueous environment, said viscosity modifier being present in an amount no less than 0.2% and no greater than 5%; said aqueous environment comprising water in an amount no less than 60% and no greater than 95%, all percentages based on total weight of said fiber composition; and said fibers being suspended in bundled or in fibrillatable form within said environment which is essentially devoid of a water-settable inorganic binder material comprising cement or concrete.

17. The fiber composition of claim 16 further comprising a concrete admixture selected from the group consisting of a superplasticizer, a shrinkage reducing admixture, and a concrete-fiber bond enhancement agent.

18. The fiber composition of claim 16 wherein said fibers are coated.

19. The fiber composition of claim 16 wherein said fibers have a mean transverse dimension no greater than 30 $\mu$m.

20. A method for modifying a cementitious composition, comprising: pumping and metering, into a cementitious composition, the fiber composition of claim 16.

* * * * *